United States Patent
Calvel et al.

(10) Patent No.: US 10,421,240 B2
(45) Date of Patent: *Sep. 24, 2019

(54) MOLDING ELEMENT FOR MANUFACTURING A NOISE REDUCING TREAD

(71) Applicant: COMPAGNIE GENERALE DES ETABLISSEMENTS MICHELIN, Clermont-Ferrand (FR)

(72) Inventors: Romain Calvel, Clermont-Ferrand (FR); Khotchakorn Pengsaloong, Tokyo (JP)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/764,693

(22) PCT Filed: Sep. 20, 2016

(86) PCT No.: PCT/JP2016/004288
§ 371 (c)(1),
(2) Date: Mar. 29, 2018

(87) PCT Pub. No.: WO2017/056459
PCT Pub. Date: Apr. 6, 2017

(65) Prior Publication Data
US 2018/0272639 A1   Sep. 27, 2018

(30) Foreign Application Priority Data
Sep. 30, 2015  (WO) .................. PCT/JP2015/078426

(51) Int. Cl.
B29D 30/06   (2006.01)
B60C 19/00   (2006.01)
(Continued)

(52) U.S. Cl.
CPC ..... *B29D 30/0681* (2013.01); *B29D 30/0606* (2013.01); *B29D 30/66* (2013.01);
(Continued)

(58) Field of Classification Search
CPC ........ B29D 30/0606; B29D 2030/0612; B29D 2030/0616; B29C 33/123; B60C 11/1369
See application file for complete search history.

(56) References Cited

U.S. PATENT DOCUMENTS

| | | |
|---|---|---|
| 5,843,326 A | 12/1998 | Bellot |
| 6,143,223 A | 11/2000 | Merino Lopez |

(Continued)

FOREIGN PATENT DOCUMENTS

| | | |
|---|---|---|
| EP | 0 858 875 A1 | 8/1998 |
| JP | 55-113606 U | 8/1980 |

(Continued)

OTHER PUBLICATIONS

International Search Report issued in PCT/JP2016/004288 dated Nov. 1, 2016.

*Primary Examiner* — James P Mackey
(74) *Attorney, Agent, or Firm* — Dickinson Wright PLLC

(57) ABSTRACT

The present disclosure provides a molding element for a mold used for manufacturing a tread of a tire having a plurality of contacting element, a plurality of grooves and a connecting member connecting two side faces of adjacent contacting elements, the molding element having a molding surface and a rib for forming the groove between adjacent contacting elements, at least two rib side faces, the rib having a notching portion, a guiding member made of a material different from a material of the molding element being received in the notching portion and has two opposite side faces and a top face, the material of the guiding member having a modulus at 10% elongation lower than that of the
(Continued)

molding element, the guiding member having a guiding slit, the guiding member has a recessed area extending in a direction along the guiding slit on the top face and an outermost portion of the guiding slit is open in the recessed area.

7 Claims, 7 Drawing Sheets

(51) Int. Cl.
    *B29D 30/66*     (2006.01)
    *B29C 33/12*     (2006.01)

(52) U.S. Cl.
    CPC .......... *B60C 19/002* (2013.01); *B29C 33/123* (2013.01); *B29D 2030/0607* (2013.01); *B29D 2030/0612* (2013.01); *B29D 2030/665* (2013.01)

(56) References Cited

U.S. PATENT DOCUMENTS

| | | | |
|---|---|---|---|
| 6,484,772 B1 * | 11/2002 | De Labareyre | B29D 30/52 |
| | | | 152/209.17 |
| 2008/0152744 A1 | 6/2008 | Nguyen et al. | |
| 2010/0186861 A1 * | 7/2010 | Ishiguro | B60C 11/0306 |
| | | | 152/209.25 |
| 2015/0174842 A1 | 6/2015 | Pialot, Jr. | |
| 2018/0001715 A1 | 1/2018 | Tezuka | |

FOREIGN PATENT DOCUMENTS

| | | |
|---|---|---|
| JP | 2002-331525 A | 11/2002 |
| JP | 2010-253694 A | 11/2010 |
| KR | 10-2013-0078562 A | 7/2013 |
| WO | 2013/178473 A1 | 12/2013 |
| WO | 2016/104662 A1 | 6/2016 |

* cited by examiner

MOLDING ELEMENT FOR MANUFACTURING A NOISE REDUCING TREAD

CROSS-REFERENCE TO RELATED APPLICATIONS

This application is a 371 national phase entry of PCT/JP2016/004288, filed 20 Sep. 2016, which claims the benefit of International Patent Application No. PCT/JP2015/078426, filed 30 Sep. 2015.

BACKGROUND

In recent years, premiumisation and quality improvement of vehicles leads, from the view point of occupant's comfort and environmental considerations, desire to various noise reductions, in particular pass-by noise.

When a contacting element on a tread of a tire enters to or exits from a contact patch during rolling, the tread is forced to be bent due to flattening. At this stage, geometrical discontinuity caused by periodical contact of relatively axial grooves to the contact patch leads inhomogeneity of a bending stiffness of the tread in a circumferential direction and excites internal construction of the tire to generate noise.

In order to reduce such inhomogeneity of the bending stiffness of the tread in a circumferential direction, it is known that reduction of a volume of the axial groove is effective. However, it is also known that reduction of the volume of the axial groove penalizes hydroplaning performance of the tread. Thus, it is desired to improve noise performance while maintaining hydroplaning performance.

The applicants have proposed in FIG. 1 of an international patent application PCT/JP2015/086150, a pneumatic tire tread having a connecting member connecting a transverse face of a contacting element to a transverse face of a circumferentially adjacent contacting element and being made of a material having a higher Young modulus than a Young modulus of a contacting element to obtain satisfactory hydroplaning performance and satisfactory noise performance at the same time. In FIG. 6, is disclosed a pneumatic tire tread having a connecting member connecting a transverse face of a contacting element to a transverse face of circumferentially adjacent contacting element and extending continuously through two transverse faces of the same contacting element for improving productivity of such tread.

However, embedding such connecting member in the contacting element so as to connect two side faces of adjacent contacting elements across the groove requires complicated manufacturing process, thus improvement of productivity of such tread is still insufficient.

EP0858875A1 discloses, in FIG. 1, a mold having a first die and a second die functionally adapted to form at least one orifice allowing a rubber passing through the orifice during molding. However with such configuration, it is difficult to remove the first die or the second die which forms a bottom of a groove or an incision in particular in a form of a tire, thus a complicated process for removing such die is still required.

KR20130078562A discloses, in FIGS. 3 to 5, a method and a mold for manufacturing a pneumatic tire having a reinforced cord crossing a groove using a reinforced cord insertion block installed in a mold. However with such configuration, it is difficult to give a movement to the reinforced cord insertion block, necessary to place the reinforced cord into the reinforced cord insertion block thus a complicated process is still required, and moreover difficult to prevent rubber from flashing into the groove.

US20080152744A1 discloses, in FIG. 1, a molding element suitable for molding sunken grooves or sipes in a tread, and such device may be comprised of a thin flexible wire. However, with such molding element it is difficult to place a connecting member as to connect side faces of different contacting elements as the thin flexible wire is pulled out from the tread.

A "tire" means all types of elastic tire whether or not subjected to an internal pressure.

A "green tire" means a superposition of a plurality of semi-finished rubber products present in the form of strips or sheets, with or without reinforcement. The green tire is intended to be vulcanized in a mold in order to obtain the tire.

A "tread" of a tire means a quantity of rubber material bounded by lateral surfaces and by two main surfaces one of which is intended to come into contact with ground when the tire is rolling.

A "mold" means a collection of separate molding elements which, when brought closer towards one another, delimit a toroidal molding space.

A "molding element" of a mold means part of a mold. A molding element is, for example, a mold segment.

A "molding surface" of a molding element means a surface of the mold that is intended to mold a surface of the tread.

A "modulus at 10% elongation" is a tensile stress (in MPa) at ten percent (10%) elongation measured according to ASTM standard D412.

A "groove" is a space between two rubber faces/sidewalls which do not contact between themselves under usual rolling condition connected by another rubber face/bottom. A groove has a width and a depth.

It is thus an object of the disclosure to provide a molding element for a mold used for manufacturing a tread of a tire, such molding element can improve productivity for manufacturing a tread provided with a connecting member connecting two side faces of adjacent contacting elements.

SUMMARY

The present disclosure provide a molding element for a mold used for manufacturing a tread of a tire having a plurality of contacting element delimited by a plurality of grooves and a connecting member connecting two side faces of adjacent contacting elements, the molding element having a molding surface for forming a contact face of the contacting elements intended to come into contact with ground during rolling and a rib for forming the groove between adjacent contacting elements, at least two rib side faces forming the side faces of the contacting element, the rib having a notching portion, a guiding member made of a material different from a material of the molding element being received in the notching portion and has two opposite side faces configured to form a part of the side faces of the contacting element and a top face configured to form a part of a bottom of the groove, said material of the guiding member having a modulus at 10% elongation lower than that of the molding element, the guiding member having a guiding slit extending from one of the two opposite side faces to the other of the two opposite side faces through the guiding member and radially from the top face, the guiding member has a recessed area extending in a direction along the guiding slit on the top face and an outermost portion of the guiding slit is open in the recessed area.

This arrangement improves productivity for manufacturing a tread provided with a connecting member connecting two side faces of adjacent contacting elements.

Since the guiding slit extends from one of the opposite two side faces to the other of the opposite two side faces through the guiding member, the guiding slit can receive the connecting member to be positioned at a predetermined position during molding, and release the connecting member from the mold during demolding without any complicated process. As a result, productivity for manufacturing the tread provided with the connecting member can be improved.

Since the material constituting the guiding member has lower modulus at 10% elongation than that of the molding element, it is possible to let the connecting member enter to/exit from the guiding slit. Once the connecting member has passed, the guiding slit is substantially closed for preventing rubber from flashing into the guiding slit during molding which would prevent rubber from flashing in the groove after demolding.

Since the guiding member made of the material different from the material constituting the molding element is received in the notching portion, it is possible to maintain a form of the side faces of the contacting element. As a result hydroplaning performance can be maintained. At the same time, since the guiding member which exposed to stresses from the connecting member is constructed as a separate and replaceable member in the molding element, maintenance of the molding element can be easier.

Since the guiding member has a recessed area extending in a direction along the guiding slit on the top face and an outermost portion of the guiding slit is open in the recessed area, the connecting member can be securely guided toward the guiding slit during molding, even if the connecting member is not appropriately aligned with the guiding slit. As a result, productivity for manufacturing the tread provided with the connecting member can more effectively be improved.

In another preferred embodiment, the guiding member comprises a narrowed portion constituting a narrowest portion of the guiding member.

According to this arrangement, a volume of the guiding member having different heat conductivity from the molding element can be reduced, vulcanization process can be simplified.

Further, the narrowed portion works as preventing portion which prevents the guiding member from slipping out from the rib during demolding. As a result, productivity for manufacturing the tread provided with the connecting member can more effectively be improved.

By positioning the narrowed portion at a radially lower level below radially outermost of the guiding slit, above effect of preventing the guiding member from slipping out from the rib during demolding can further be improved.

In another preferred embodiment, a width (axial length) Ws of the narrowed portion is wider than or equal to twice a diameter DC of the connecting member.

If the width Ws of the narrowed portion is less than twice the diameter DC of the connecting member, there is a risk that the connecting member is not able to pass through the guiding slit during molding and demolding due to insufficient volume to pass through for the connecting member to compress the guiding member.

By setting the width Ws of the narrowed portion being wider than or equal to twice the diameter DC of the connecting member, when the connecting member passes through the guiding slit, the guiding member can sufficiently deform so as to provide enough space for passage of the connecting member and therefore, productivity for manufacturing the tread provided with the connecting member can effectively be improved.

The width Ws of the narrowed portion is preferably less than 4 times the diameter DC of the connecting member.

In another preferred embodiment, a radial depth Vr of the recessed area relative to the radial position of the top face is at least equal to 0.2 mm and at most equal to 5.0 mm.

If the a radial depth Vr of the recessed area relative to the radial position of the top face is less than 0.2 mm, there is a risk that the connecting member may not be guided toward the guiding slit as guiding member may deform opposite to the guiding slit when the connecting member is not appropriately aligned with the rib projection opening portion.

If the radial depth Vr of the recessed area relative to the radial position of the top face is more than 5.0 mm, there is a risk of hydroplaning performance degradation as such distance would create a bump in a bottom of the groove at the place corresponding to the guiding slit.

By setting the radial depth Vr being at least equal to 0.2 mm and at most equal to 5.0 mm, productivity for manufacturing the tread provided with the connecting member can effectively be improved while maintaining sufficient hydroplaning performance of such tread.

The radial depth Vr of the recessed area relative to the radial position of the top face is preferably at least equal to 0.3 mm and at most equal to 4.0 mm, more preferably at least equal to 0.3 mm and at most equal to 3.0 mm and still more preferably at least equal to 0.5 mm and at most equal to 2.5 mm.

In another preferred embodiment, the top face of the guiding member is at least partly covered by a pair of rib projecting members projecting from opposed side faces of the notching portion and the guiding slit is exposed through a rib projection opening portion formed between the pair of rib projecting members which is devoid of the guiding member.

According to this arrangement, the pair of rib projecting members is able to prevent the guiding member from slipping out from the rib during demolding while securing the connecting member entering to/exiting from the guiding slit thanks to the raised portion of the guiding member. As a result, productivity for manufacturing the tread provided with the connecting member can effectively be improved.

By arranging the pair of rib projecting members so as to cover the raised portion completely, such effect of preventing the guiding member from slipping out from the rib during demolding can further be emphasized.

BRIEF DESCRIPTION OF DRAWINGS

Other characteristics and advantages of the disclosure arise from the description made hereafter in reference to the annexed drawings which show, as nonrestrictive examples, the embodiments of the disclosure.

In these drawings.

DETAILED DESCRIPTION

Figure 1:
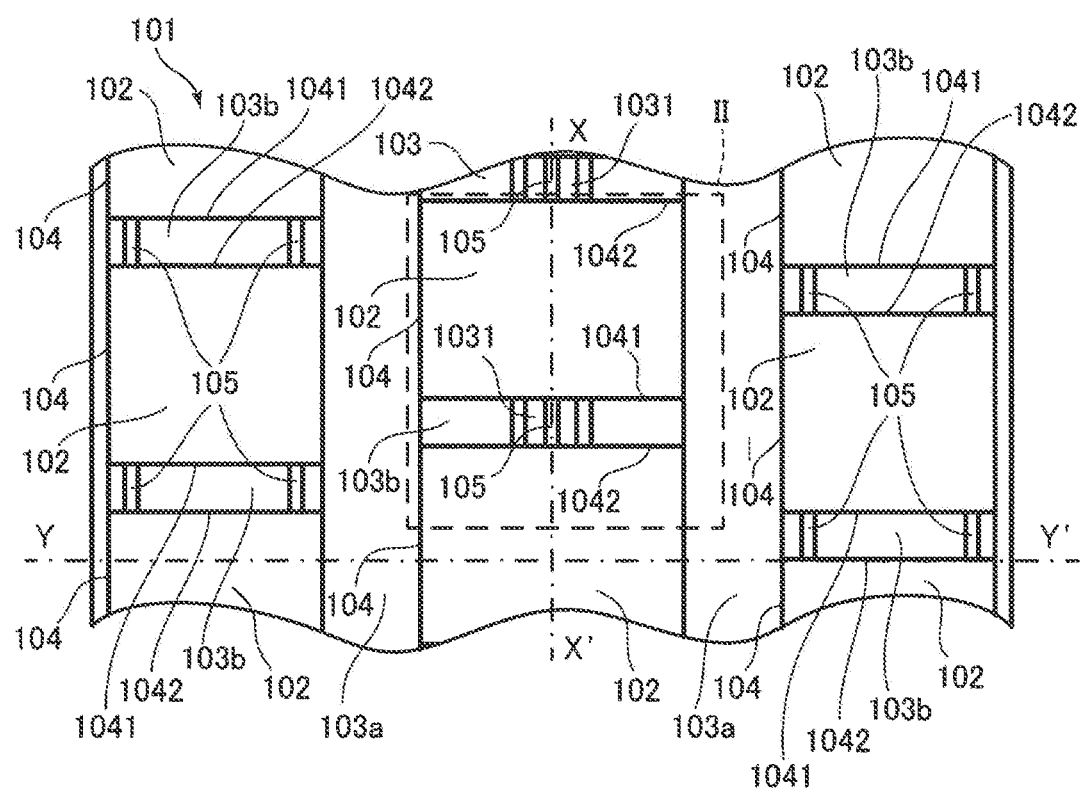
FIG. 1 is a schematic plan view of a tread for a tire molded with a mold comprising a molding element according to first embodiment of the present disclosure.

Preferred embodiments of the present disclosure will be described below referring to the drawings.

A molding element 1 for a mold used for manufacturing a tread 101 of a tire, a mold comprising the molding element 1, and a tread 101 molded and vulcanized using the mold according to an embodiment of the present disclosure will be described referring to FIGS. 1 to 5.

Figure 2:
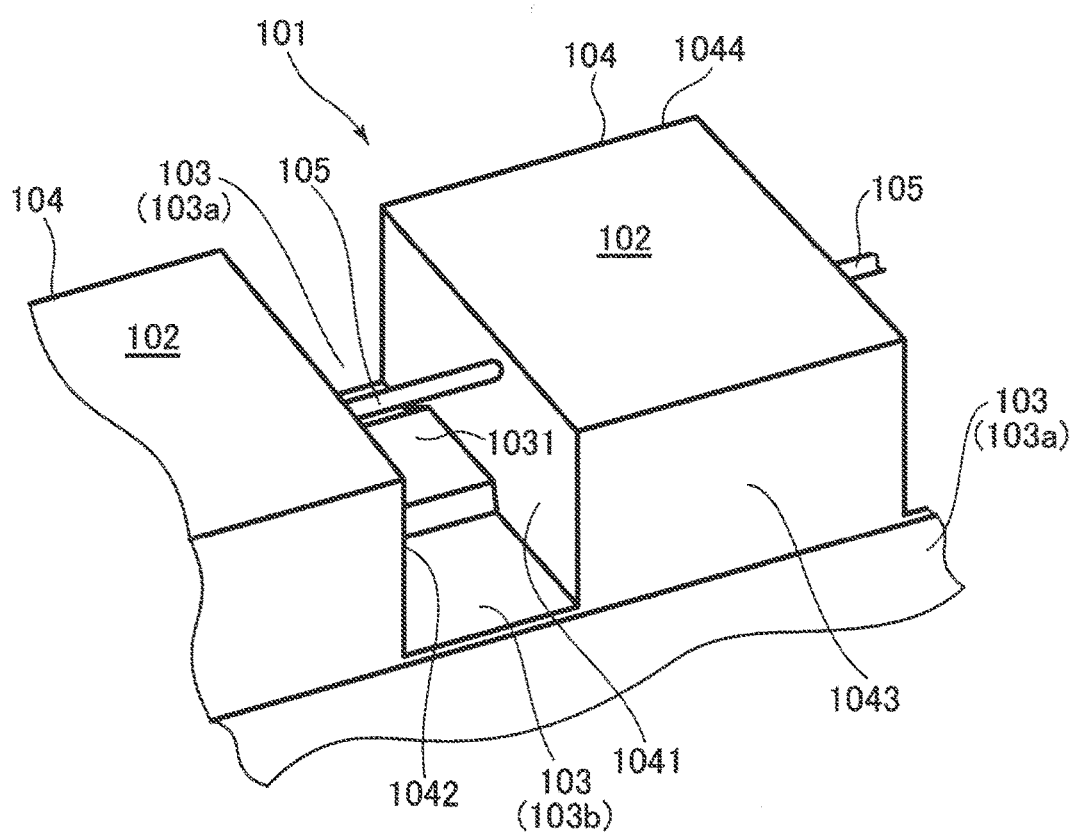
FIG. 2 is an enlarged schematic perspective view showing a portion indicated as II in FIG. 1.
Figure 3:
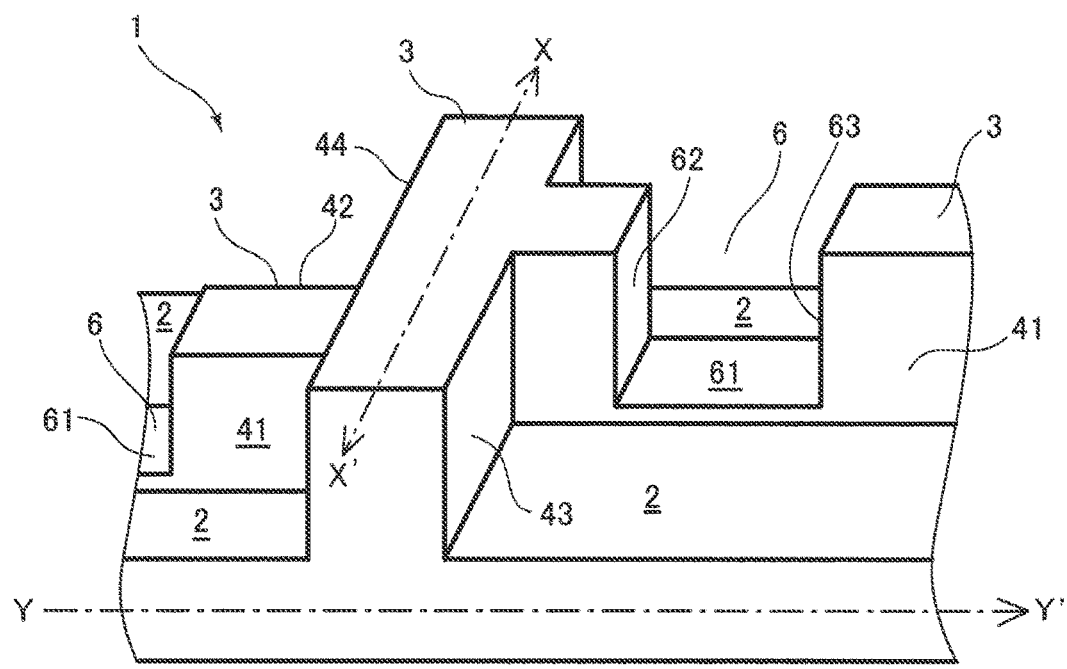
FIG. 3 is a schematic perspective view of a portion of the molding element according to first embodiment of the present disclosure.
Figure 4:
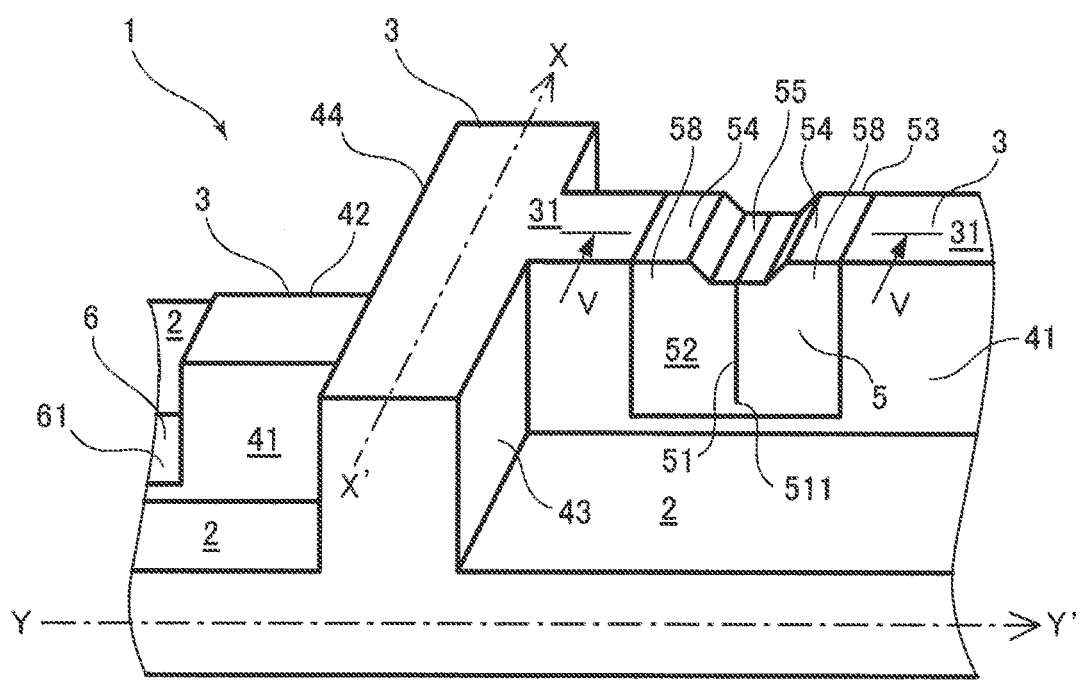
FIG. 4 is a schematic perspective view of a portion of the molding element with a guiding member according to first embodiment of the present disclosure.
Figure 5:
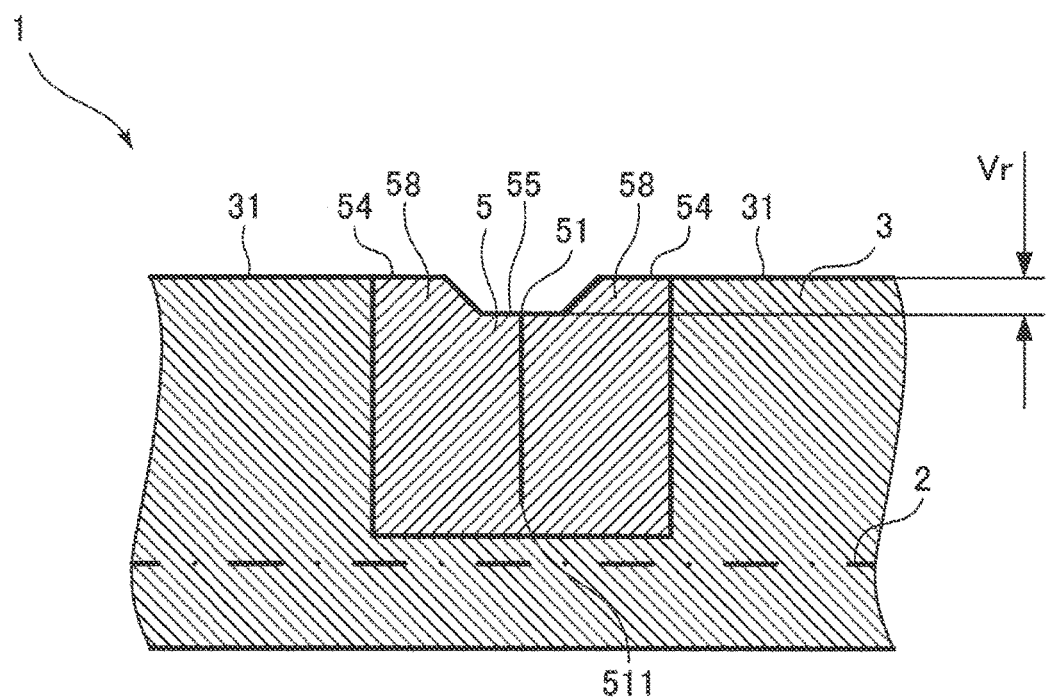
FIG. 5 is a cross sectional view taken along line V-V in FIG. 4.

FIG. 1 is a schematic plan view of a tread for a tire molded with a mold comprising a molding element according to a first embodiment of the present disclosure. FIG. 2 is an enlarged schematic perspective view showing a portion indicated as II in FIG. 1. FIG. 3 is a schematic perspective view of a portion of the molding element according to the first embodiment of the present disclosure. FIG. 4 is a schematic perspective view of a portion of the molding element with a guiding member according to the first embodiment of the present disclosure. FIG. 5 is a cross sectional view taken along line V-V in FIG. 4.

The tread 101 is a tread for a tire having dimension 205/55R16 and comprises a plurality of circumferential grooves 103*a* extending in a tire circumferential direction indicated as XX' and axial grooves 103*b* extending in a generally tire axial direction indicated as YY'.

As shown in FIG. 1, a plurality of contacting elements 104 having generally rectangular parallelepiped shape is formed in the tread 101. The contacting element 104 is delimited by the circumferential grooves 103*a* in a circumferential direction and is delimited by axial grooves 103*b* in an axial direction. Thus, the contacting element 104 has two transverse faces (frontal faces) 1041, 1042 facing to circumferentially opposite directions.

Adjacently arranged contacting elements 104 in a circumferential direction are separated by the axial groove 103*b*. The contacting element 104 has a contact face 102 intended to come into contact with ground during rolling at a top portion thereof.

The tread 101 has the same structure as the conventional tread except for an arrangement regarding the connecting member 105 and is intended to be applied to a conventional pneumatic radial tire. Thus, description of the internal construction of the tread 101 will be omitted.

Between two circumferentially adjacent contacting elements 104, a connecting member 105 having a thin rod-like shape is provided. The connecting member 105 extends across the axial groove 103*b* between two circumferentially adjacent contacting elements 104, as shown in FIGS. 1 and 2.

In the present embodiment, one connecting member 105 is provided between circumferentially adjacent contacting elements 104 in axially central region in the tread 101. That is, in an axially central area, circumferentially adjacent contacting elements 104 are connected by one connecting member 105.

On the other hand, two connecting members 105 are provided between circumferentially adjacent contacting elements 104 in axially outward regions in the tread 101. That is, in axially outward areas, circumferentially adjacent contacting elements 104 are connected by two connecting members 105. Two connecting members 105 are positioned at the same radial position.

In the present embodiment, the connecting members 105 are arranged so as to extend substantially along the circumferential direction maintaining the same distance from the rotation axis of the tire. That is, the connecting members 105 extend in parallel to the contact face 102.

Each connecting member 105 extends along the circumferential groove 103*a*, thus an angle of an extending direction of the connecting member 105 relative to the tire circumferential direction is 0 degree.

In the axially central area of the tread 101, a rectangular protrusion 1031 is integrally formed at a bottom of the axial groove 103*b*, as shown in FIGS. 1 and 2. Specifically, the rectangular protrusion 1031 extends from one transverse face (frontal face) 1041, 1042 to the other transverse face (frontal face) 1042, 1041 and has a trapezoid shape in an axial cross section.

In the arrangement of the first embodiment, inhomogeneity of the bending stiffness of the tread 101 in circumferential direction can be drastically decreased, which results less excitation of internal construction of the tire. Thus, noise generated during rolling of the tire can be reduced.

Next, a molding element 1 for a mold used for manufacturing the tread 101 will be described referring to FIGS. 3, 4 and 5.

As shown in FIG. 3, the molding element 1 has a molding surface 2 intended to mold the contact face 102 of the contacting element 104. The molding element 1 also has a plurality of ribs 3 intended to mold the groove 103*a*, 103*b* so as to radially outwardly extend from the molding surface 2.

The rib 3 includes a rib top face 31 intended to mold a bottom of the groove 103*a*, 103*b*. A radial position of the rib top face 31 can be the same among the ribs 3, or can be different among the ribs 3.

The rib 3 intended to mold the axial groove 103*b* also includes circumferentially opposing rib side faces 41, 42 intended to mold the frontal faces 1041, 1042 of the contacting element 104. The rib 3 intended to mold the axial groove 103*b* includes a notching portion 6. The notching portion 6 is formed by removing a part of the rib 3 and has generally rectangular parallelepiped shape defined by a bottom face 61 and axially opposing side faces 62, 63.

The notching portion 6 receives therein a guiding member 5 having a top face 54 and circumferentially opposed two side faces 52, 53 and being complementary to the notching portion 6. An internal space of the notching portion 6 is filled with the guiding member 5 such that the top face 54 is flush with the rib top face 31 and the side faces 52, 53 are flush with the rib side faces 41, 42 of the rib 3, respectively, as shown in FIG. 4. Thus, the side faces 52, 53 of the guiding member 5 are to form a part of the frontal side faces 1041, 1042 of the contacting element 104.

On the top face 54, the guiding member has a recessed area 55 having a trapezoidal shape in an axial cross section and extending in circumferential direction between two side faces 52, 53. Both axial sides of the recessed area 55 are formed as raised portions 58.

A radial depth Vr of the recessed area 55 relative to the radial position of the top face 54 is at least equal to 0.2 mm and at most equal to 5.0 mm.

The material constituting the guiding member 5 has a modulus at 10% elongation lower than that of the molding element. The material of the guiding member 5 is preferably an elastomeric composition. An example of the elastomeric composition is, for example saturated or unsaturated rubbers and thermoplastic elastomers.

The guiding member 5 has a guiding slit 51 extending circumferentially through the guiding member 5 and radially inwardly from the top face 54. That is, the guiding slit 51 extends from one of the opposite two side faces 52, 53 to the other of the opposite two side faces 53, 52 through the guiding member 5 and is open to circumferentially the side faces 52, 53 and radially to the recessed area 55 in the top face 54 of the guiding member 5.

As shown in FIG. 5, a radially outward end of the guiding slit 51 opens at an axially central position in the recessed area 55 in the top face 54 of the guiding member 5. The guiding slit 51 terminates radially inwardly at a closed end 511 near the bottom face 61 of the notching portion 6.

Although the guiding slit 51 extends radially in the present embodiment, the guiding slit may extend with an angle relative to radial orientation for better demolding of the connecting member 105 for example in a region where an orientation perpendicular to the molding surface 2 differs from radial orientation of the molding element 1. The guiding slit 51 may extend along slightly curved path in radial orientation and/or in circumferential orientation.

A manufacturing of a tread 101 of a tire using a molding element of the first embodiment will be described.

As a first step, at least one connecting member 105 having diameter DC is circumferentially disposed on a surface of an unvulcanized green tire. The unvulcanized green tire with the connecting member 105 is placed in a mold having at least one molding element 1 described above.

The connecting member 105 is an elongated member such as cable, wire or strings. The connecting member 105 may be put on the surface of unvulcanized green tire, partly or completely, manually or automatically using a process similar to put semi-finished material circumferentially. The connecting member 105 may be sticked onto the surface of unvulcanized green tire with a help of, for example an adhesive or another unvulcanized rubber.

Then, as the unvulcanized green tire is moved toward the mold element 1, the connecting member 105 on the surface of the unvulcanized green tire is in contact with an upper end of the guiding slit 51 and then, forcibly opens the upper end of the guiding slit 51.

Then, the connecting member 51 is continuously pushed downwardly by portions of the green tire located in circumferentially both sides of the rib 3 and penetrated into and moved downwardly toward the closed end 511 along the guiding slit 51, deforming the guiding member 5 outwardly in a width direction. Once the connecting member 51 has passed, the guiding slit 51 is closed again.

Once the connecting member 105 reaches the closed end 511 of the guiding slit 51, the connecting member 105 cannot be further moved and stop at the closed end 511. On the other hand, the portions of the green tire located in circumferentially both sides of the rib 3 further continuously downwardly moves toward the molding surface 2 of the molding element 1. Since the guiding slit 51 is closed behind the connecting member 105, the rubber does not enter into the guiding slit 51.

Once the portions of the green tire located in circumferentially both sides of the rib 3 reaches the molding surface 2 of the molding element 1, the portions of the green tire stop moving and the mold is closed.

Then heat and pressure is applied for vulcanizing and molding the green tire. During this process, the green tire is turned to the tread 101 of the tire, to which tread 101 the connecting member 105 is fixedly attached so as to connect two frontal faces 1041, 1042 of the adjacent contacting elements 104. Specifically, a part of the connecting member 105 is exposed in the axial groove 103*b* and remaining part of the connecting member 105 is embedded in the contacting elements 104.

After completion of vulcanization and molding, the mold is opened. During demolding, the part of the connecting member 105 exposed in the axial groove 103*b* is escaped from the guiding member 5 passing through the guiding slit 51.

With the molding element 1, it is possible to manufacture the tread 101 of a tire having the plurality of contacting element 104 delimited by a plurality of the grooves 103 and having the connecting members 105 connecting two side faces 1041, 1042, 1043, 1044 of adjacent contacting elements 104 without complicated process and thus it is possible to improve productivity for manufacturing such tread 101.

Since the guiding slit 51 opens to the two side faces 52, 53 and the top face 54 of the guiding member 5 and extends radially, it is possible to position the connecting member 105 at a predetermined position in the contacting elements 104 and to leave the connecting member 105 there without any complicated process.

According to the molding 1 of the present embodiment, since the guiding member 5 has a recessed area 55 extending in a direction along the guiding slit 51 on the top face and an outermost portion of the guiding slit 51 is open in the recessed area 55, the connecting member 5 can be securely guided toward the guiding slit 51 during molding, even if the connecting member 5 is not appropriately aligned with the guiding slit 51.

Alternatively, the notching portion 6 is filled with the guiding member 5 may be made of a liquid elastomeric composition which will have necessary characteristics described above after certain period of duration after being filled into the notching portion 6.

Figure 6:
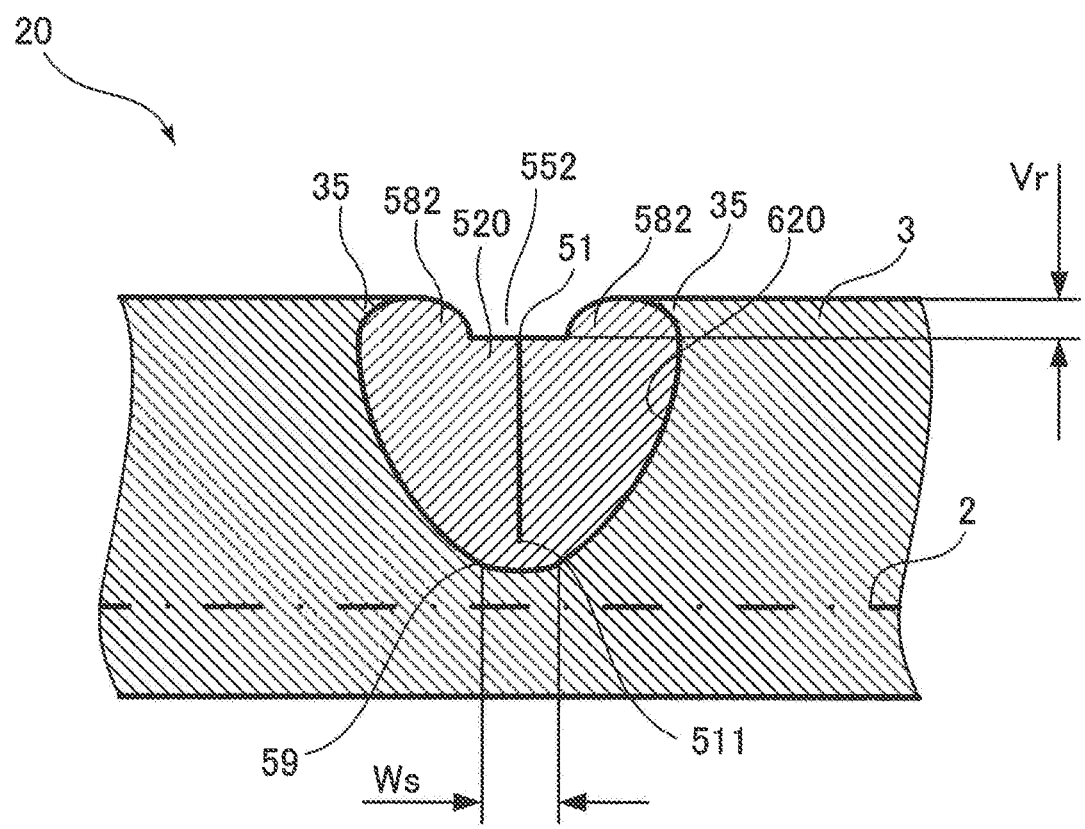
FIG. 6 is a schematic cross sectional view of a molding element according to second embodiment of the present disclosure.

A molding element 1 according to a second embodiment of the present disclosure will be described referring to FIG. 6. FIG. 6 is a schematic cross sectional view of a molding element according to the second embodiment of the present disclosure. The constitution of this second embodiment is similar to that of the first embodiment other than the arrangement shown in FIG. 6, thus description will be made referring to FIG. 6.

In the second embodiment, the guiding member 520 has a "heart-shape" in an axial cross section and a notching portion 620 has a "heart-shape" complementary to that of the guiding member 520.

An upper (radially outward) portion of the guiding member 520 has a flat recessed area 552 and raised portions 582, 582 provided on the both sides of the flat recessed area 552. In the present embodiment, the raised portion 582 has a cylindrical shape. The flat recessed area 552 and the raised portions 582, 582 have the same cross section in a circumferential direction.

An outermost end of the guiding slit 51 is upwardly open to the recessed area 552. A top portion of each raised portion 582 is flush with the rib top face 31. Further, an outward top face of the raised portion 582 is covered by a pair of rib projecting members 35 projecting inwardly from opposed side faces 62, 63 of the notching portion 620.

On the other hand, a bottom portion of the guiding member 520 has a narrowed portion 59. A width (axial length) Ws of the narrowed portion 59 is wider than or equal to twice the diameter of the connecting member 105.

A radial depth Vr of the recessed area 552 relative to the top portion of each raised portion 582 is at least equal to 0.2 mm and at most equal to 5.0 mm.

Figure 7:
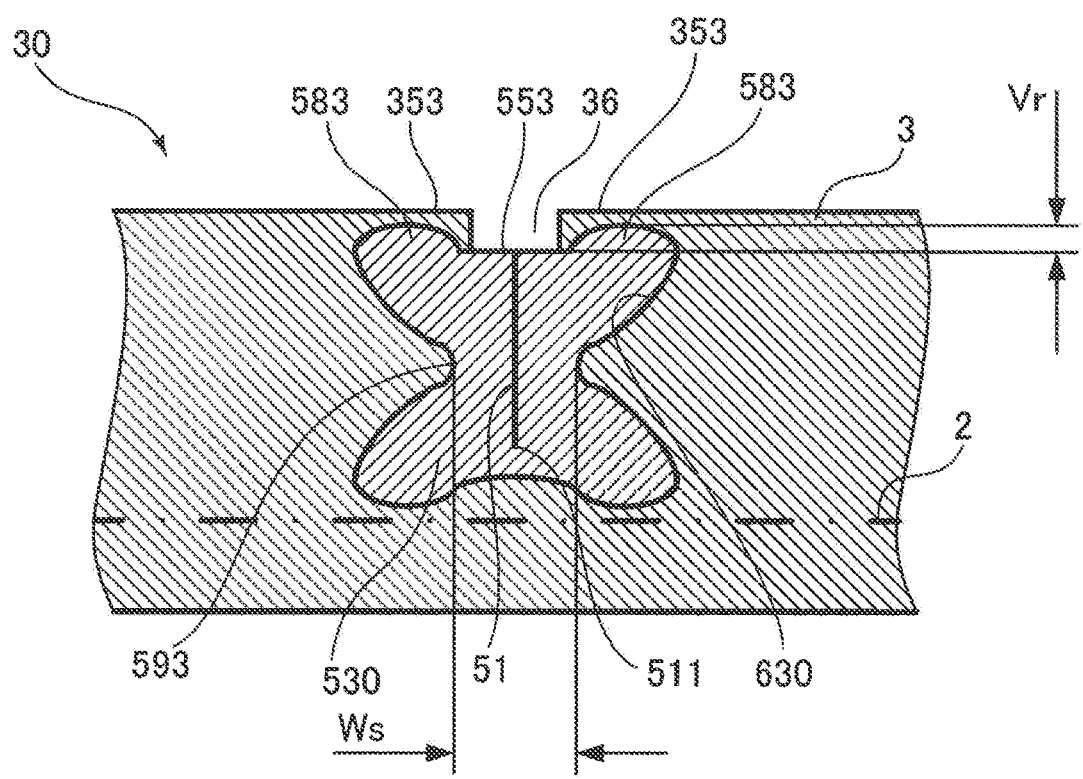
FIG. 7 is a schematic cross sectional view of a molding element according to third embodiment of the present disclosure.

A molding element 30 according to a third embodiment of the present disclosure will be described referring to FIG. 7. FIG. 7 is a schematic cross sectional view of a molding element according to third embodiment of the present disclosure. The constitution of this third embodiment is the similar to that in the second embodiment other than the arrangement shown in FIG. 7, thus description will be made referring to FIG. 7.

In the third embodiment, a guiding member 530 has a "saltire" shape in an axial cross section and a notching portion 630 has a "saltire" shape complementary to the guiding member 530, as shown in FIG. 7.

An upper portion of the guiding member 530 has a flat recessed area 553 and raised portions 583, 583 provided on the both axial sides of the flat recessed area 553. In the present embodiment, the raised portion 583 has a cylindrical shape. The flat recessed area 553 and the raised portions 583, 583 have the same cross section in a circumferential direction.

An outermost end of the guiding slit 51 is upwardly open to the center recess area 553. The raised portions 583, 583 are fully covered by a pair of rib projecting members 353, 353 projecting inwardly from opposed side faces of the notching portion 630. A top face of the rib projecting member 353 is flush with the rib top face 31.

Thus, the top face of the raised portions 583, 583 are fully covered by a pair of rib projecting members 353, 353

An outermost end of the guiding slit 51 is upwardly open radially to the recessed area 553 through a rib projection opening portion 36 defined between rib projecting members 353, 353.

A radially central portion of the guiding member 530 has a narrowed portion 593. A width (axial length) Ws of the narrowed portion 593 is wider than or equal to twice the diameter of the connecting member 105.

A radial depth Vr of the recessed area 553 relative to the top face of the rib projecting member 353 is at least equal to 0.2 mm and at most equal to 5.0 mm.

The rib projection opening portion 36 can be additionally filled with other member. If the rib projection opening portion 36 is also filled with the other member, creation of a bump in the groove 103 at the place corresponding to the rib projection opening portion 36 is avoidable. As a result, potential impact on hydroplaning performance due to degradation of groove volume can be prevented.

The disclosure is not limited to the examples described and represented and various modifications can be made there without leaving its framework.

In the above embodiments, although the guiding member and the notching portion are axially symmetric, the guiding member and the notching portion can be axially asymmetric.

In the above embodiments, although the recessed area has flat shape, the recessed area may have various shape, symmetry or asymmetry, to be able to guide correctly the connecting member 105 toward the guiding slit 51, for example a V-shape, or a concave shape.

The invention claimed is:

1. A mold employed for manufacturing a tread of a tire having a plurality of contacting elements delimited by a plurality of grooves and a connecting member connecting two side faces of adjacent contacting elements of the plurality of contacting elements, comprising:
   a molding element having a molding surface for forming a contact face of one of the contacting elements, and a rib for forming the groove between adjacent contacting elements,
   at least two rib side faces forming the side faces of one of the contacting elements of the plurality of contact elements, the rib having a notching portion,
   a guiding member made of a material different from a material of the molding element being received in the notching portion and has two opposite side faces shaped to form a part of the side faces of the one contacting element and a top face shaped to form a part of a bottom of the groove, said material of the guiding member having a modulus at 10% elongation lower than that of the molding element, the guiding member having a guiding slit extending from one of the two opposite side faces to the other of the two opposite side faces through the guiding member and radially from the top face,
   wherein the guiding member has a recessed area extending in a direction along the guiding slit on the top face and an outermost portion of the guiding slit is open in the recessed area.

2. The mold according to claim 1, wherein the guiding member comprises a narrowed portion constituting a narrowest portion of the guiding member.

3. The mold according to claim 2, wherein the narrowed portion is positioned at a radially lower level below the outermost portion of the guiding slit.

4. The mold according to claim 2, wherein a width Ws of the narrowed portion is more than or equal to twice a diameter of the connecting member.

5. The mold according to claim 1, wherein a radial depth of the recessed area relative to the radial position of the top face is at least equal to 0.2 mm and at most equal to 5.0 mm.

6. The mold according to claim 1, wherein the top face of the guiding member is at least partly covered by a pair of rib projecting members projecting from opposed side faces of the notching portion, and the guiding slit is exposed through a rib projection opening portion formed between the pair of rib projecting members which is devoid of the guiding member.

7. The mold according to claim 6, wherein the guiding member has at least two raised portions on both sides of the recessed area and the pair of rib projecting members is arranged as to fully cover the top face of the raised portions.

* * * * *